Aug. 30, 1932.  C. R. ROCHE  1,874,352
AUTOMOBILE CONSTRUCTION FOR FRONT WHEEL DRIVE
Filed Feb. 21, 1928  3 Sheets-Sheet 1
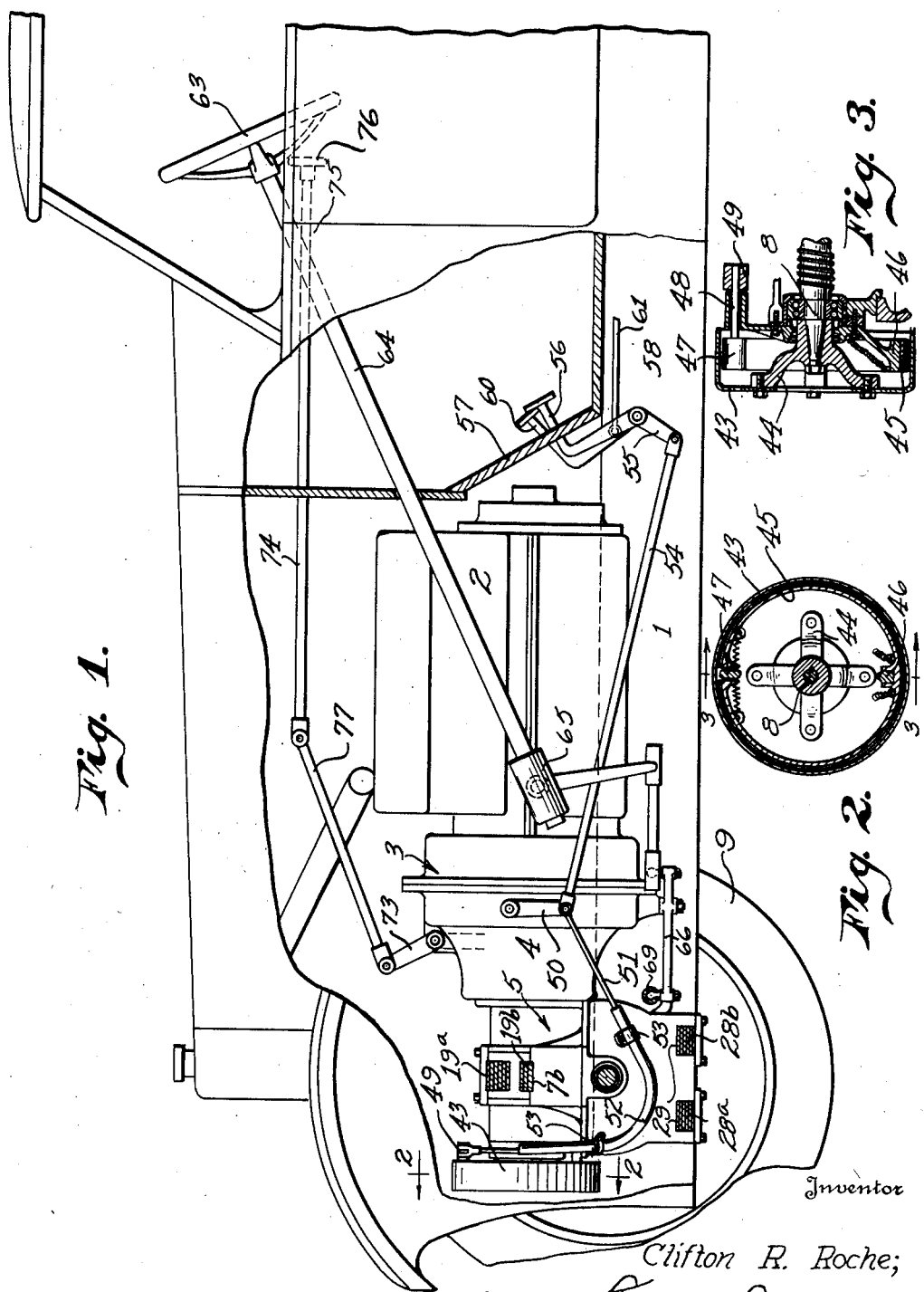
Inventor
Clifton R. Roche;
By Lyon & Lyon
Attorneys

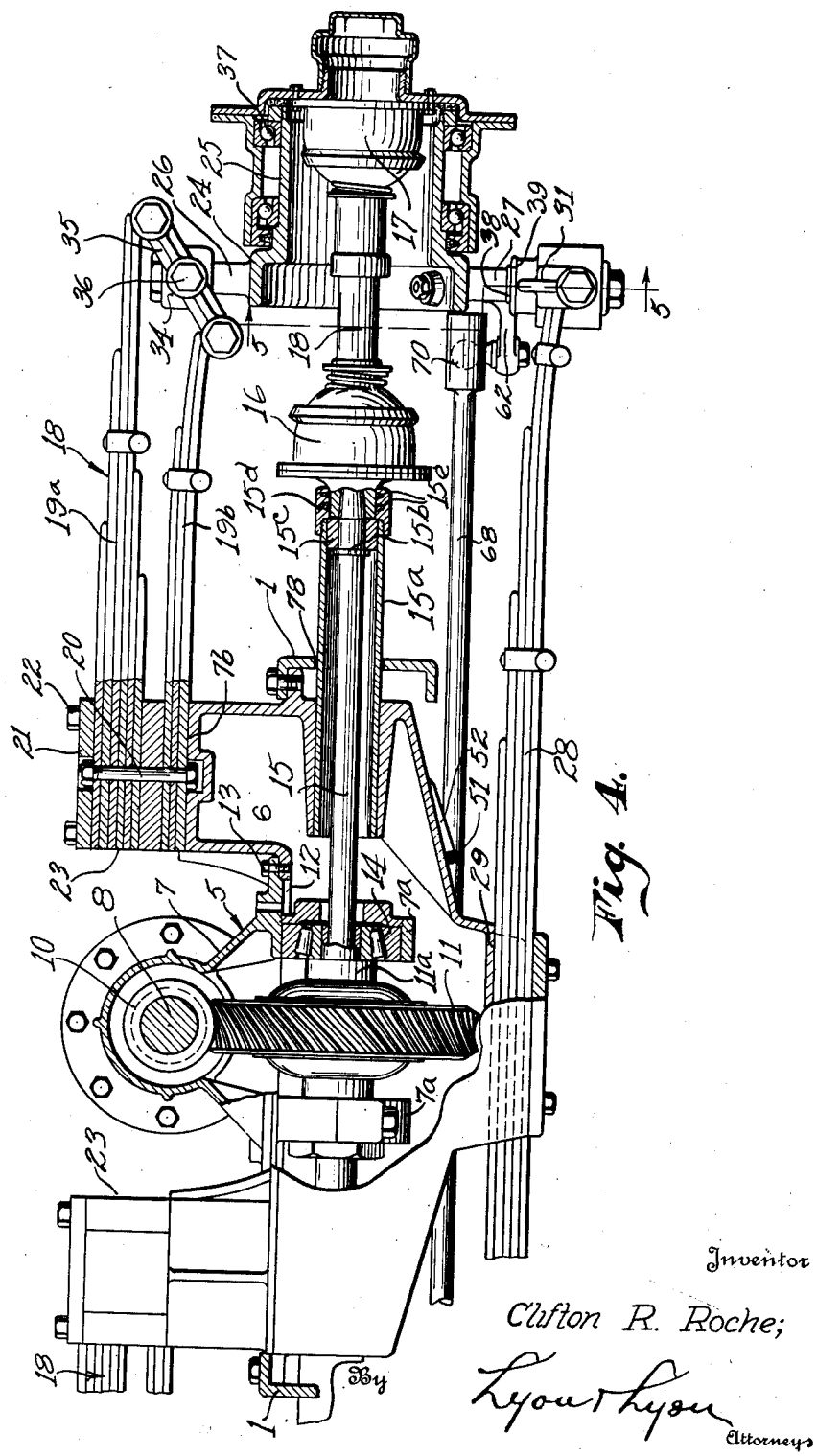

Aug. 30, 1932.  C. R. ROCHE  1,874,352
AUTOMOBILE CONSTRUCTION FOR FRONT WHEEL DRIVE
Filed Feb. 21, 1928   3 Sheets-Sheet 3

Inventor
Clifton R. Roche;
By
Attorneys

Patented Aug. 30, 1932

1,874,352

UNITED STATES PATENT OFFICE

CLIFTON R. ROCHE, OF LOS ANGELES, CALIFORNIA, ASSIGNOR TO AUTOMOTIVE RESEARCH AND MANUFACTURING COMPANY, OF RENO, NEVADA, A CORPORATION OF NEVADA

AUTOMOBILE CONSTRUCTION FOR FRONT WHEEL DRIVE

Application filed February 21, 1928. Serial No. 255,922.

This invention relates to the construction of automobiles and particularly to automobiles having a front wheel drive. In one aspect, the invention may be considered as involving improvements in the mechanisms disclosed in my prior patents—"automobile" granted November 18, 1924, No. 1,515,815 and "vehicle wheel", granted April 28, 1925, No. 1,535,497. The general object of the invention is to provide a construction for an automobile which particularly adapts it for a front wheel drive; also to provide a construction which will facilitate the removal of the driving connections from the engine to the front axle.

A further object of the invention is to improve the construction and arrangement of the forward springs and to provide a construction which will increase the road clearance at the front wheels.

A further object of the invention is to provide an improved construction for an automobile of this type which will facilitate the application of brakes and the operation of the steering gear.

A further object of the invention is to provide improved means for controlling the transmission from the dash of the automobile.

Further objects of the invention will appear hereinafter.

The invention consists of the novel parts and combination of parts to be described hereinafter, all of which contribute to produce an efficient automobile construction for front wheel drive.

A preferred embodiment of the invention is described in the following specification, while the broad scope of the invention is pointed out in the appended claims.

In the drawings:

Figure 1 is a side elevation of an automobile embodying my invention broken away and showing certain parts in section.

Figure 2 is a vertical section through the forward brake taken about on the line 2—2, Fig. 1.

Figure 3 is a vertical section taken in a front and rear direction through the forward brake on the line 3—3 of Fig. 2.

Figure 4 is a front elevation and partial section further illustrating the construction at the front axle.

Figure 5:
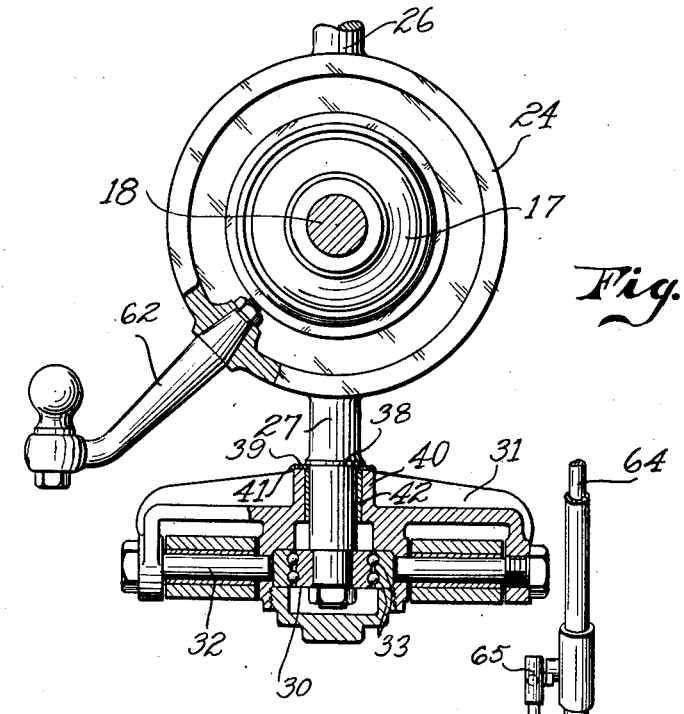
Figure 5 is a vertical section taken about on the line 5—5 of Fig. 4, certain parts being broken away; this view particularly illustrates the connection of the lower spring to the lower king pin of the knuckle.

In practicing the invention, I provide an automobile with a frame comprising two side bars 1 of channel form (see Fig. 4). In the forward end of the car or automobile an engine 2 is supported, forward of which a clutch 3 is provided having a casing 4, the forward portion of which carries the transmission mechanism of the automobile. Forward of the clutch, I provide a forward housing 5 (see Fig. 4) which comprises a main housing 6 in the form of a hollow casting and a worm wheel housing 7, the former of which is supported on the side bars 1. The housing 7 carries mechanism which enables the driving shaft 8 to drive the forward wheels 9. The driving mechanism includes a worm 10 carried on the forward end of the driving shaft 8 which meshes with a worm wheel 11. This worm wheel and worm are both supported in the housing 7 which is preferably cast iron like the main housing 6. The lower part of the housing 7 is formed into two hangers 7a which extend down through an opening 12 on the upper side and middle portion of the main housing 6. The housing 7 is secured in place over this opening by means of suitable bolts or studs 13. These hangers 7a carry suitable anti-friction bearings 14 which support the differential 11a for the forward shafts 15. The worm wheel 11 is mounted upon differential 11a. Each shaft 15 drives a corresponding wheel through suitable universal driving connections 16 and 17 connected together by a sliding connection at 18, which sliding connection is fully disclosed in my former patents.

Each shaft 15 is mounted in a tubular axle housing 15a. The outer end of the shaft has a collar 15b against which a bronze bushing 15c seats, held in place by a retaining nut 15d with internal grooves to carry felt packing 15e.

Each wheel is connected through spring means with the housing 6. For this purpose the main housing is provided at each side with an elevated shoulder which forms a spring seat 7b. Each spring seat 7b supports a spring 18, preferably comprising an upper bank 19a of spring leaves and a lower bank 19b of spring leaves, the said banks of leaves being bolted together with a through bolt 20 and secured on the seat by means of a cap plate 21 and bolts 22.

The butt ends 23 of the springs 18 are spaced apart and in this space the housing 7 is removably placed (see Fig. 4).

Each wheel is supported on a steering knuckle 24 comprising a substantially cylindrical shell 25 provided at its inner end with an upper king pin 26 and a lower king pin 27, the said king pins being in axial alignment with each other with their axes located on a vertical line. I provide a lower spring 28 which preferably consists of two separate springs 28a and 28b (see Fig. 1). These springs are disposed alongside of each other in horizontal plane, and their middle points are attached to a spring seat 29 on the underside of the main housing 6. The lower king pin 27 is mounted in a suitable ball bearing 30 in a yoke 31 and this yoke is attached to the ends of the spring members 28a and 28b. For this purpose the yoke 31 is provided with anchor pins 32 which extend in a front and rear plane. The ball bearing 30 preferably has two ball races 33, so that it operates as a thrust bearing taking the vertical thrust which is imparted through the king pins to the springs. A ball bearing having a casing 34 is provided for the upper king pin 26 which is substantially similar in construction to the ball bearing 30. The ball bearing casing 34 is connected to the spring members 19a, 19b. In the present instance, this is effected by means of a shackle 35 consisting of two double levers, the middle portions of which are pivotally attached at 36 to the opposite sides of the ball bearing casing 34 and the ends of which are pivotally attached to the ends of the spring members.

Each wheel is supported on the cylindrical body 25 of the knuckle by means of suitable ball bearings 37 (see Fig. 4). In order to exclude water and dust from the ball bearing 30, I prefer to provide the lower king pin 27 with a narrow annular shoulder 38 (see Fig. 5) and below this shoulder a tight steel washer 39 is provided which seats on the upper end of the boss or hub 40 of the yoke 31. This steel washer may have its outer edge 41 crimped down slightly so that it sheds water coming down the pin 27 and keeps it from getting into the bushing 42 for the king pin 27.

In order to provide a forward brake, I extend the forward driving shaft 8 beyond the worm 10 (see Fig. 3) and provide the same with a brake drum 43 secured to the end of the shaft by means of a spider 44 (see Fig. 3). On the inner side of the brake drum, an expanding brake band 45 is provided, the lower end of which is secured to an anchor 46 (see Fig. 3), that extends down from the forward end of the housing 7. The brake band 45 may be expanded at will by means of a double cam toe 47, the shaft 48 of which carries a brake lever 49. I provide means for operating this brake whenever the clutch 3 is moved to its open position. For this purpose, I provide the clutch with a clutch lever 50 (see Fig. 1), and I connect this clutch lever by means of a flexible pull rod 51 with a lever 49. This flexible shaft or pull rod 51 is carried in a tubular housing 52 attached by clips 53 to the side of the housing 6.

The lever 50 may be actuated by a link 54 which extends back to a bell crank lever 55, the upper arm of which is bent laterally to form a brake pedal 56 extending through the forward floor board 57 (see Fig. 1) and pivotally mounted in the bracket 58 attached to the automobile frame. Alongside of the brake pedal 56, I provide a similar brake pedal 60, which is formed as a lever pivoted on the bracket 58 and carrying a connection in the form of a link 61 which connects to the rear brakes of the automobile. The upper ends of these pedals are in substantial alignment. This enables the driver to depress both pedals simultaneously with a single foot on both the brake pedals 56 and 60, so that he can apply the forward brake and also apply the brakes to the rear wheels; at the same time, the clutch 50 will be pulled in a direction to open the clutch.

In order to move the knuckles 25 in steering, I provide each knuckle with a rigid arm 62 (see Fig. 5). These arms extend down and inwardly from the side of the knuckle.

Figure 6:
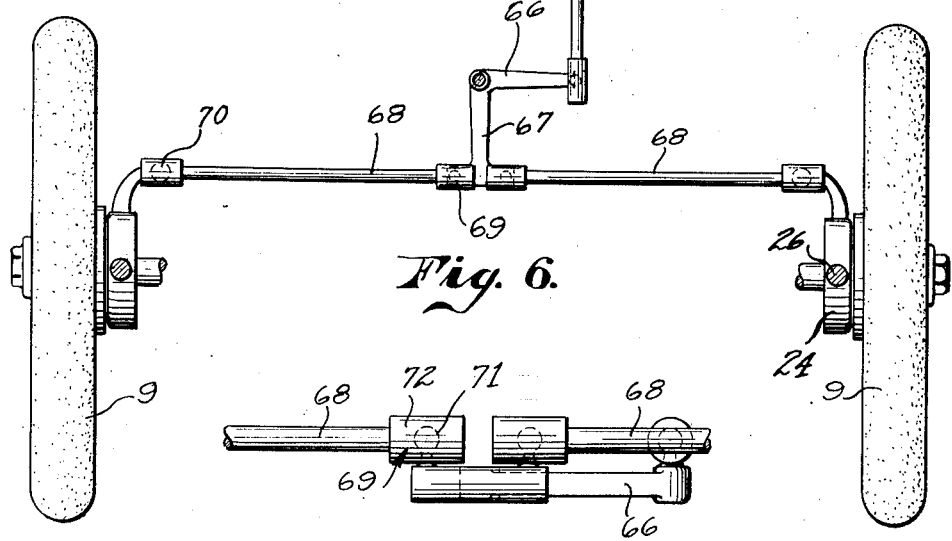
Figure 6 is a plan of the front wheels and showing the steering connections to the same, certain parts being broken away.
Figure 7:
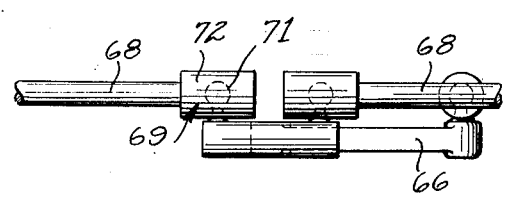
Figure 7 is a front elevation of the steering mechanism where the steering lever is located, the drag links being broken away.

In Fig. 6, I illustrate the preferred embodiment of the steering mechanism for connecting the steering wheel 63 of the automobile to the knuckles. The steering post 64 is connected by a suitable mechanism 65 to a bell crank lever 66, the forward arm 67 of which is connected to two drag links 68 which extend in opposite directions from it. Each drag link is connected by a flexible joint connection 69 with the end of the arm 67 and at its outer end is connected by similar connections 70 with its corresponding knuckle. These connections 69 and 70 are preferably of the ball and socket type, that is to say, one of the members is formed with a ball 71 (see Fig. 7) held in a socket head 72.

These connections 69 and 70 give this drag link flexibility and particularly adapt it for use in a front wheel drive.

In order to shift the mechanism of the transmission which is located forward of the clutch 3, I connect the transmission control lever 73 with a shift rod 74 which is guided to shift longitudinally in the dash 75. This shift rod has a head 76 for pulling it out or shoving it in and the forward end of the rod 74 is connected by a link 77 with the lever 73.

In an automobile construction having the features described above, it will be evident that by removing the bolts 13 the worm wheel and worm can be readily removed after the shaft sections 15 have been disconnected from the worm wheel. The connection between the shaft 15 and the worm wheel may be the usual "key" or fluted type employed for connecting differential gears to the sections of rear driving shafts for rear axles.

By placing the two spring sections 28a and 29b alongside of each other, I give the knuckles increased stability in the front and rear plane and I also increase the road-clearance, that is to say, I give the automobile a much greater road clearance than it would have if an equivalent leaf spring were provided with the leaves all banked in a vertical direction. The side bars 1 of the frame are provided with openings 78 through which the shafts 15 pass.

It is understood that the embodiment of the invention described herein is only one of the many embodiments this invention may take, and I do not wish to be limited in the practice of the invention, nor in the claims, to the particular embodiment set forth.

What I claim is:

1. In an automobile construction for a front wheel drive, the combination of a housing in the form of a hollow casting supported at the forward end of the frame, having a hollow shoulder at each side with an upper face forming a spring seat, a transverse front spring supported on each shoulder at each side of the automobile, means for connecting the end of each spring with its corresponding wheel, said housing including a worm housing carrying a driving worm and located in the space between the said springs, a worm wheel, axially aligned shafts driven thereby corresponding to the wheels, bearings for the shafts in the housing maintaining their axial alignment, and flexible joints connecting the ends of the shafts with the front wheels.

2. In an automobile construction for a front wheel drive, the combination of a frame, a forward housing supported on the frame, having a spring seat at each side, a spring corresponding to each front wheel supported on its corresponding spring-seat, a forwardly disposed engine, a drive-shaft driven by the engine and having a worm mounted in said forward housing, a worm-wheel mounted in the said housing, with shafts for driving the forward wheels, a brake-drum carried by the forward end of the drive shaft, a clutch between the engine and the drive-shaft with a clutch-lever, a brake for the brake-drum anchored on the said forward housing, a pedal connected with the clutch-lever for actuating the same, and a flexible pull rod connecting the clutch lever and extending across one of said shafts and connected with the brake to actuate the same.

3. In an automobile construction for a front wheel drive, the combination of a forward driving shaft at each side, a pair of forward wheels driven respectively by said shafts, a pair of vertically alined upper transverse springs corresponding to each wheel located in vertical alinement with their corresponding shafts, means for supporting the inner portion of each spring so that the butt ends of the springs are spaced apart, a housing with driving parts for the wheels carried therein and located in the space between the butt ends of the springs, a knuckle corresponding to each wheel connected with the springs for supporting the same, and a pair of springs connected to the knuckle, disposed apart in a horizontal direction attached to the forward housing and connected with the lower end of the knuckle.

4. In an automobile construction for a front wheel drive, the combination of a pair of front wheels, a transverse spring corresponding to each wheel, a forward housing supporting the inner portions of said springs with the butt ends of the springs spaced apart, a knuckle corresponding to each wheel having the body in the form of a shell with a king-pin at the upper side of the shell and a king-pin at the lower side of the shell, a yoke receiving the lower king-pin and having a bearing for the same, a pair of springs supported on the said forward housing disposed apart in a substantially horizontal plane and with their ends connected with the said yoke, and means for connecting the upper springs with the upper pins.

5. In an automobile construction for a front wheel drive, the combination of a frame, a forwardly disposed engine, a driving shaft extending forward from the engine between the front wheels, means for driving the front wheels from the driving shaft, a brake-drum on the forward end of the driving shaft with a brake for the same, a clutch between the engine and the driving shaft with a clutch-lever, a brake pedal connected with the clutch-lever and the brake for simultaneously opening the clutch and applying the brake to the driving shaft and thereby brake the wheels on both sides of the car, and a second brake pedal alongside of the first named brake pedal having means for connecting the same with the rear brakes of the automobile, said brake pedals having their upper ends substantially aligning to enable both pedals to be depressed simultaneously by one foot of the driver.

6. In an automobile construction for a front wheel drive, the combination of a frame, a forwardly disposed engine, a drive-shaft driven by the engine and extending forwardly between the front wheels of the automobile, means for driving the front wheels of the automobile from the said drive-shaft, a brake-drum carried at the forward end of said drive-shaft, a brake therefor, a clutch between the engine and the drive-shaft, with a clutch shaft for operating the clutch and a clutch lever carried by the clutch shaft to rock the same, said clutch lever located on the side of the engine, a movable member within reach of the driver, a lever actuated thereby, a link connecting the last named lever with the clutch lever for operating the clutch and a flexible pull rod connecting the clutch lever with said brake for actuating the same.

Signed at Los Angeles, California, this 6th day of February, 1928.

CLIFTON R. ROCHE.